Dec. 22, 1942.    A. B. CADMAN    2,305,603
SAFETY SWITCH
Filed Sept. 25, 1939
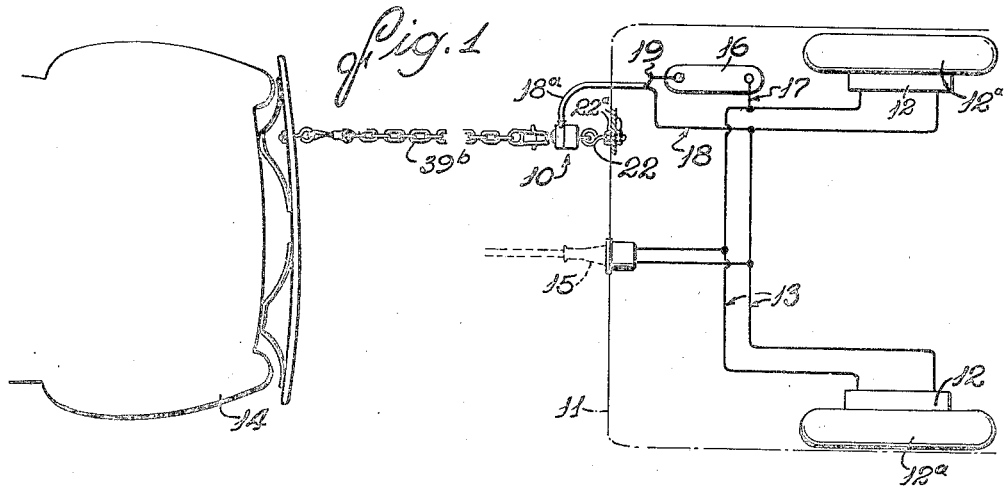
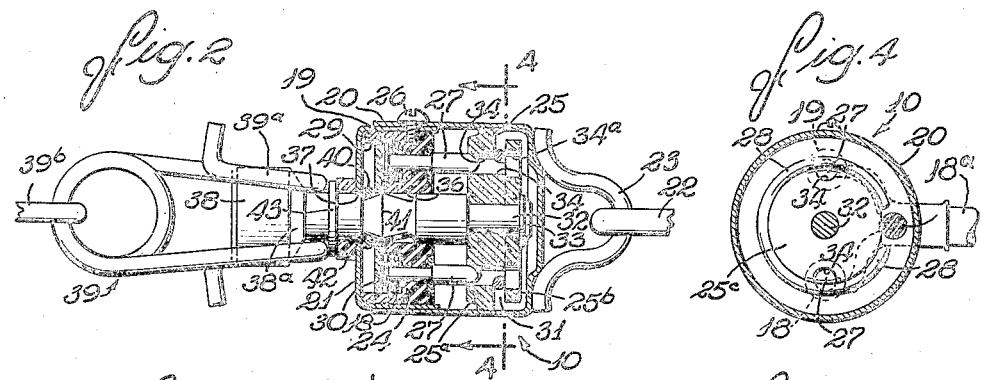
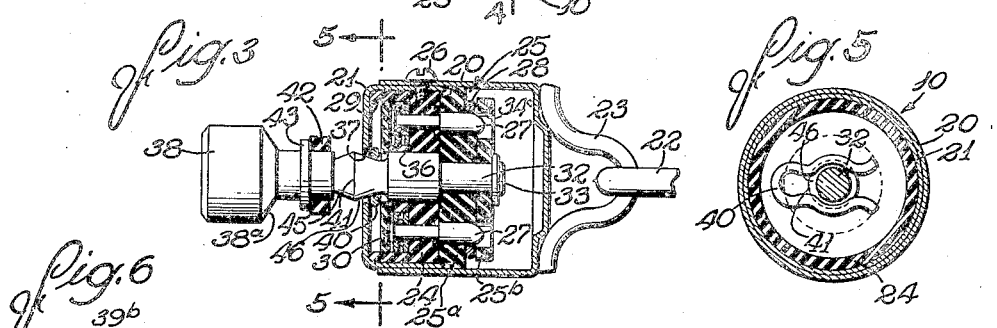
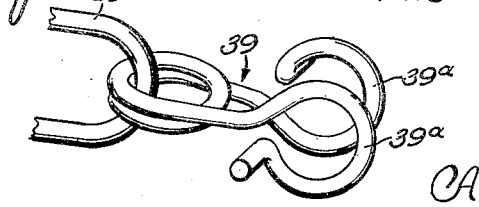
INVENTOR
Addi B. Cadman
By Parker, Carlson, Pitzner + Hubbard
ATTORNEYS Patented Dec. 22, 1942

2,305,603

UNITED STATES PATENT OFFICE 2,305,603

SAFETY SWITCH

Addi B. Cadman, Beloit, Wis., assignor to Warner Electric Brake Manufacturing Company, South Beloit, Ill., a corporation of Illinois Application September 25, 1939, Serial No. 296,389

7 Claims. (Cl. 200—52)

The invention relates to a novel form of safety switch which is particularly adapted for use to effect the automatic closure of a brake energizing circuit in a trailer in case the draft connection between the trailer and its tractor is broken.

Generally stated, it is an object of the invention to provide an improved switch suitable for the purpose indicated, which is simple, compact and rugged in construction, and which may be mounted conveniently on any character of trailer and yet will operate reliably under emergency conditions.

The invention also resides in the novel structure for carrying out the foregoing object.

Further objects and advantages of the invention will become apparent as the following description proceeds, taken in connection with the accompanying drawing, in which Figure 1 is a generally schematic plan view illustrating the application of a switch embodying the invention in a trailer brake system.

Fig. 2 is an enlarged side elevation of the switch and its associated parts with the switch in longitudinal section.

Fig. 3 is a longitudinal section of the switch similar to Fig. 2 but showing the switch contacts in closed rather than open position.

Figs. 4 and 5 are transverse sectional views along the lines 4—4 and 5—5 in Figs. 2 and 3 respectively.

Fig. 6 is a detail perspective view of a snap spring included in the tension-released actuating connection for the switch.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the invention has been shown herein as embodied in a switch, designated generally by the numeral 10 (Fig. 1), applied to the emergency energizing circuit for effecting application of electric brakes 12 on the wheels 12ª of a trailer 11. The brake system may be of any suitable form of which many are well known. Current for effecting normal application of the brakes 12 is supplied through conductors 13, normally connected to a source of current (not shown) on the tractor 14 through a coupling, generally indicated at 15, and under the control of a suitable switching mechanism (not shown) in the tractor.

The function of the improved safety switch 10 is to apply the brakes 12 by connecting the leads 13 automatically to a supplemental source of current on the trailer, shown as a battery 16, in case the draft connection (not shown) between the trailer and the tractor 14 is interrupted unintentionally. For this purpose, one of the conductors 13 is permanently connected to one battery terminal by a lead 17, while the other connector is connected to the other battery terminal through leads 18 and 19 with the normally open switch 10 interposed between them. Consequently, when the switch 10 is closed, in a manner which will hereinafter appear, in response to rupture of the draft connection, the battery 16 energizes the brake mechanisms and causes the trailer to be stopped automatically, thus insuring safety of operation.

In the instant embodiment (see Fig. 2), the switch 10 includes a casing made up of two opposed cup-shaped sheet metal sections 20 and 21 dimensioned to fit in telescoped relation as shown and held together by one or more screws 26. At their junction, the sections are apertured to receive a cable 18ª housing the conductors 18 and 19. For convenience in mounting on the trailer, the section 20 is hung from the eye 22 of a bolt projecting through the wall or other part at the front of the trailer and clamped thereto by nuts 22ª. The eye 22 interlocks with a loop 23 welded to the closed end of the casing section 20.

Slidable within the casing is an insulating member 25 composed of two disks 25ª and 25ᵇ rigidly connected together by a plunger 32 of a form described below. A second insulating member 24 is positioned in the opposite end of the casing where it is held by a screw 26. Two shouldered contact pins 27 project through holes in the member 24 on opposite sides of its axis and are riveted to the member in clamping engagement with the terminal ends of the conductors 18 and 19. An insulating washer 30 covers and protects the butt ends of the pins and bared portions of the conductors.

The rounded projecting ends of the pins aline with holes 34 and 34ª in the member 25 and project part-way into the holes 34 when the insulating members are axially separated as shown in Fig. 2. The ends are adapted for engagement with a resilient split contact ring 28 encircling a hub 25ᶜ on the disk 25ª. The ring 28 is of a diameter slightly less than the overall spacing of the pins 27 so that when the member 25 is shifted axially from the position shown in Fig. 2 to that of Fig. 3, the pins are projected through the holes 34 and 34ᵃ and the ring engaged and spread by the rounded ends of the pins. The ring thus bridges the pins firmly, thereby establishing an electrical connection between the two and therefore between the conductors 18 and 19. By so locating the pins normal to the plane of the ring, and so as to enter and expand the ring, stability of ring position and good contact between the pins and ring is always insured despite inaccuracies in dimensioning or location of the parts and despite the fact that, as shown, even less than three pins be used.

Actuation of the switch 10, in response to parting of the trailer draft connection is accomplished by means of a plunger 32 slidable in a central aperture 36 (Fig. 2) in the stationary insulator 24. The inner end of the plunger is shouldered to receive the disks 25ᵃ and 25ᵇ which are held by a rivet head 33 formed on the plunger. The other end of the plunger projects through an aperture 37 in the end of the casing section 21 and its outer end is fashioned to provide an enlarged head 38 cooperating with a snap spring 39 to form a tension-releasable connection between the plunger and a chain 39ᵇ (see Fig. 1) anchored on a rear bumper of the tractor 14.

The snap spring 39 is fashioned from a piece of resilient wire having its ends bent in loop form, as indicated at 39ᵃ (Fig. 6) and dimensioned to engage the plunger head 38 (Fig. 2) and form a socket therefor. When the trailer draft connection is intact, the chain hangs slack. Upon parting of the draft connection, however, the chain is, of course, jerked taut, thereby pulling the plunger 38 outwardly from the position of Fig. 2 to that of Fig. 3 so that the switch contacts 27 are bridged. Further outward motion of the plunger is blocked, however, by the engagement of the insulating members 24 and 25. Accordingly, the increased tension on a chain 39ᵇ causes the spring loops 39ᵃ to ride up on the tapered inner end face 38ᵃ of the plunger head and thereby separate so as to free the head 58 from its socket. In this way, the switch is automatically actuated to closed position and thereafter completely disconnected from the tractor 14.

To hold the plunger 32 releasably in either open or closed position, a U-shaped spring clip or detent 40 (Fig. 5) is arranged between the casing end wall and the washer 30 (Fig. 3). Cooperating with this detent spring is an enlargement 41 on the plunger shank presenting oppositely tapered faces 45 and 46. When the switch is in its open position (Fig. 2), the spring 40 engages the outer face 45 and yieldably resists outward movement of the plunger. However, when the plunger is pulled outward to the position of Fig. 3 in order to close the switch, the spring 40 rides over the enlargement 41 and bears against the inner tapered face of the latter so as to hold the switch in closed position. Additionally, as the spring arms ride down this inner face of the enlargement 41, they tend to urge the plunger 32 outward so as to insure complete and effectual closing of the switch contacts. The detent spring 40 is made weaker than the spring clip 39 so that upon an application of tension to the chain 39ᵇ, the detent will always be released for closing of the switch prior to the disengagement of the spring clip from the plunger head.

The detent for holding the plunger 32 alternatively in open or closed position, as described above, also aids in maintaining a water-tight seal for the end of the switch casing through which the plunger projects. The only movable part projecting from the switch casing is the plunger 32 so that the only point at which sealing difficulties are likely to be encountered is at the casing aperture 37 through which the plunger extends. Water-tight sealing of this aperture is, however, important because when traveling along a road in wet weather, water is likely to be splashed over the switch, and if it were permitted to enter the same it would short circuit it, thus applying the trailer brakes and possibly causing a serious accident. Such a seal may be formed by a yieldable rubbed washer 42 (Figs. 2 and 3) encircling the plunger between a shoulder 43 thereon and the end wall of the casing. The thickness of the washer 42 is so proportioned relative to the spacing of the shoulder 43 from the casing end wall that it will be compressed against the latter, effectually closing the aperture 37 when the plunger is in its retracted position. Since the detent spring 40 urges the plunger inward in such case, the sealing washer 42 is retained firmly seated in tight sealing engagement.

It will be apparent that the improved safety switch is simple in construction and very reliable in operation primarily because the relative motion between the contact members to close the switch is in the same direction as the relative motion between the tractor and trailer which is the occasion for closing the switch. For this same reason, the safety switch may be suspended from the trailer vehicle and mounted conveniently in any of the different locations encountered in service, but regardless of the location of its mounting, the switch will be closed reliably when an emergency arises.

I claim as my invention:

1. In a switch of the type described, the combination of spaced generally parallel contact pins, an insulating support therefor, a bridging contact for said pins in the form of a resilient split ring normally spaced from the outer ends of the pins and lying in a plane substantially normal to the pin axes, and actuating means for effecting relative movement between said pins and said bridging ring axially of the latter to move the ring into encircling engagement with the set of pins, whereby said ring is expanded by the pins as it slides on to the same and stressed into tight electrical contact therewith.

2. A switch comprising, in combination, an insulating member having a generally annular groove in its periphery, a resilient split contact ring seated in said groove, said insulating member having an aperture therein extending axially of the ring and opening into the root portion of said groove, a cooperating contact prong axially alined with said aperture, and actuating means for effecting relative movement between said prong and insulating member to project the nose of the prong through said aperture into the root portion of said groove to expand said ring and maintain firm contacting engagement therewith.

3. In a switch of the type described, the combination of a pair of opposed rigid members having engageable spaced contacts on opposed portions thereof, one of said members being fixedly mounted and the other being movable toward and away from said fixed member into and out of contact-closing position, a plunger fixed on said movable member and projecting toward and beyond said fixed member, biasing means for releasably holding said members in spaced relation, and means forming a tension-releasable connection with the free outer end of said plunger releasable only upon the application of a force thereto greater than that required to release said biasing means, the abutment of said movable member against said fixed member when said members are in contact-closing position serving to limit the endwise movement of said plunger, whereby said connection is released upon application of sufficient tension thereto after said contacts are closed.

4. In a switch of the type described, the combination of a pair of opposed rigid members having mounted on one of said members a set of contact prongs projecting axially toward the other member and a split ring bridging contact on such other member positioned to embrace and resiliently engage the nose portions of said prongs when said two members are brought together, one of said members being fixedly mounted and the other being movable toward and away from said fixed member into and out of a limit contact-closing position, a plunger fixed on said movable member and projecting toward and beyond said fixed member, means for releasably holding said members in spaced relation, and means forming a tension-releasable connection with the free outer end of said plunger releasable only upon the application of a force thereto greater than that required to release said biasing means, movement of said movable member to contact-closing position causing release of said connection upon application of sufficient tension thereto after said contacts are closed.

5. A switch mechanism of the character described having, in combination, a casing, two insulating members in said casing, one fixed and the other movable toward and away from the fixed member, an actuating element connected to and movable with said movable member and projecting through said casing, a contact on one of said members, a cooperating contact on the other member engageable with said first mentioned contact upon movement of said members toward each other, detent means acting to hold said movable member releasably in switch-open and switch-closed positions, and a coupling connected to the outer end of said element and releasable automatically under tension applied thereto following movement of said movable member from one of said positions to the other against the action of said detent means.

6. In a switch, the combination with a pair of contacts comprising a resilient split ring and a prong disposed generally normal to the plane of the ring with its nose pointed toward the ring and offset slightly from the center line of the ring toward the center of curvature of the ring, of means supporting said prong and ring for relative movement in a direction axially of the ring to bring to said prong and ring into rubbing engagement with the prong contacting the inner side of the ring.

7. In a switch, the combination with a plurality of relatively movable members including a pair of contacts shiftable relative to each other between open and closed positions, and an actuator therefor, of means including a strain-releasable coupling between said actuator and at least one of said members for disconnecting the same after said actuator has been shifted a predetermined distance to move the switch contacts from one to the other of their said positions.

ADDI B. CADMAN.